(12) United States Patent
Mader et al.

(10) Patent No.: US 10,770,106 B1
(45) Date of Patent: Sep. 8, 2020

(54) SYSTEM AND METHOD USING ON-RAMP HEATING TO DETECT LASER MODE HOPPING IN HEAT ASSISTED RECORDING

(71) Applicant: Seagate Technology LLC, Cupertino, CA (US)

(72) Inventors: Drew Michael Mader, Minneapolis, MN (US); Tim Rausch, Farmington, MN (US); Josh Ward Christensen, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/724,569

(22) Filed: Dec. 23, 2019

(51) Int. Cl.
| | |
|---|---|
| *G11B 5/02* | (2006.01) |
| *G11B 7/126* | (2012.01) |
| *G11B 5/40* | (2006.01) |
| *G11B 5/012* | (2006.01) |
| *G11B 5/455* | (2006.01) |
| *G11B 11/105* | (2006.01) |
| *G11B 11/00* | (2006.01) |
| *G11B 5/60* | (2006.01) |
| *G11B 20/18* | (2006.01) |
| *G11B 7/1387* | (2012.01) |
| *G11B 7/1263* | (2012.01) |
| *G11B 7/1267* | (2012.01) |
| *G11B 5/00* | (2006.01) |

(52) U.S. Cl.
CPC .......... *G11B 7/126* (2013.01); *G11B 5/012* (2013.01); *G11B 5/02* (2013.01); *G11B 5/40* (2013.01); *G11B 5/4555* (2013.01); *G11B 5/6088* (2013.01); *G11B 7/1263* (2013.01); *G11B 7/1267* (2013.01); *G11B 7/1387* (2013.01); *G11B 11/00* (2013.01); *G11B 11/105* (2013.01); *G11B 11/10534* (2013.01); *G11B 20/1816* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,406,090 B2 | 3/2013 | Juang et al. | |
| 9,583,135 B1 * | 2/2017 | Ma | G11B 20/10305 |
| 9,595,288 B1 | 3/2017 | Chu et al. | |
| 9,620,163 B1 | 4/2017 | Zheng et al. | |
| 9,916,849 B1 * | 3/2018 | Mader | G11B 7/126 |
| 10,204,655 B1 * | 2/2019 | Ma | G11B 5/012 |
| 10,311,903 B2 * | 6/2019 | Takayama | G11B 5/455 |
| 10,366,722 B1 * | 7/2019 | Mendonsa | G11B 5/314 |
| 2017/0162222 A1 * | 6/2017 | Matousek | G11B 7/126 |
| 2020/0098391 A1 * | 3/2020 | Goggin | G11B 7/126 |

* cited by examiner

*Primary Examiner* — William J Klimowicz
(74) *Attorney, Agent, or Firm* — Mueting Raasch Group

(57) ABSTRACT

A heat-assisted recording head is moved onto a ramp such that the recording head is thermally isolated from a moving disk. A heating device is activated on the recording head to cause the recording head to obtain a high temperature that is not obtainable when proximate to the moving disk. The recording head is moved over the moving disk such that the recording head reaches an operating temperature that is below the high temperature. One or more temperatures between the high temperature and the operational temperature are determined at which a laser of the recording head experiences mode-hopping. The one or more temperatures are stored and accessed by a controller to mitigate mode hopes during an operation of the recording head.

21 Claims, 6 Drawing Sheets

7 Revs of heat

SYSTEM AND METHOD USING ON-RAMP HEATING TO DETECT LASER MODE HOPPING IN HEAT ASSISTED RECORDING

SUMMARY

The present disclosure is directed to a using on-ramp heating to detect laser mode hopping in heat-assisted recording. In one embodiment, a heat-assisted recording head is moved onto a ramp such that the recording head is thermally isolated from a moving disk. A heating device is activated on the recording head to cause the recording head to obtain a high temperature that is not obtainable when proximate to the moving disk. The recording head is moved over the moving disk such that the recording head reaches an operating temperature that is below the high temperature. One or more temperatures between the high temperature and the operational temperature are determined at which a laser of the recording head experiences mode-hopping. The one or more temperatures are stored and accessed by a controller to mitigate mode hops during an operation of the recording head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

One issue affecting a HAMR hard disk drive (HDD) is referred to as mode hopping. Mode hopping is a phenomenon which causes the light sent to the disk to change rather abruptly. Because the light being sent to the disk needs to be set very carefully, any sudden change in this light can lead to lost data during writing. For example, if the amount of light decreases below some threshold, this could lead to insufficient heating of the recording media such that data does not get written. If the light increases beyond some threshold, this could lead to overwriting of data on adjacent tracks. Even if the change in optical power is not large enough to cause either of these effects, the changes can still affect the timing of bits written to the media making data more difficult to recover. Accordingly, a concerted effort is made to understanding the size and frequency of mode hops in HAMR devices.

Mode hops are generally a periodic function with temperature. For example, some lasers will consistently mode hop every 10° C. or 11° C., but some will only show mode hops every 30° C. or so. Because mode hops do not occur at all temperatures, it can be difficult to quantify the mode hopping characteristics of a head in a factory process or in electrical testing because this may only involve subjecting the drive to a limited number of ambient temperatures during testing. To more accurately measure the mode hopping characteristics of a head, a test would preferably sweep through a range of temperatures expected in the field, plus some margin (e.g. 0° C.-80° C.), which could be done in the factory process but is expensive and time-consuming.

One way to change the temperature of a HAMR laser is to put the laser/head on the ramp, which takes the head off the spinning disk. When the disk in an HDD is spinning, the flow of gas (e.g., air/helium) cools the laser. When the disk is not spinning or when the head is off the disk, the head is not cooled by this gas flow and its temperature can get higher than when the head is on the spinning disk. So if the head is placed on the ramp and also perhaps heated (e.g., with laser current and/or with other heaters), and then loaded back onto the disk, the head will experience a large temperature change as the hot laser/head is cooled by the spinning disk. This change in temperature can be used to characterize mode hopping as described below.

Figure 1:
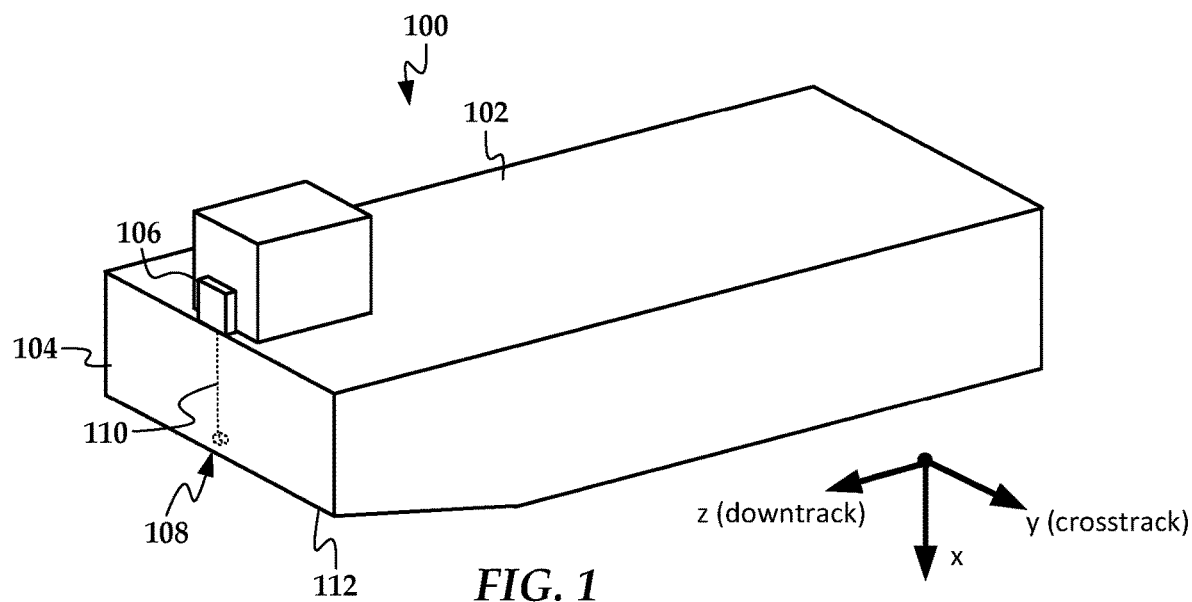
FIG. 1 is a perspective view of a slider assembly according to an example embodiment.

In reference now to FIG. 1, a perspective view shows a read/write head 100 according to an example embodiment. The read/write head 100 is used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium.

Figure 2:
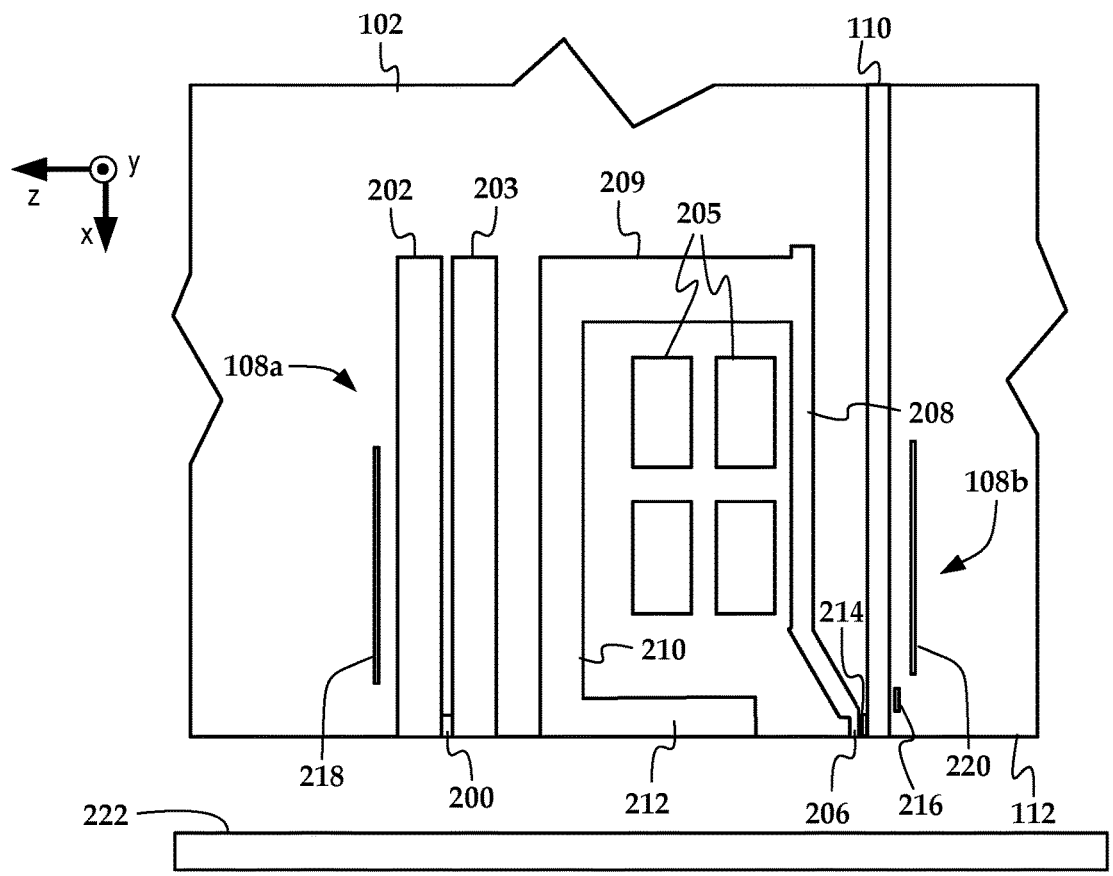
FIG. 2 is a cross-sectional view of read and write transducers according to example embodiments.

In FIG. 2, a cross-sectional view of the read/write head 100 shows details of the read/write transducers 108 according to an example embodiment. A read transducer 108a includes a read element 200 (e.g., magnetoresistive stack) located between shields 202-203. A magnetic write transducer 108b includes a write coil 205 that, when energized, induces magnetic flux through a write pole 206, yoke 208, 209, a return pole 210, and shield 212. A near-field transducer (NFT) 214 is located at the media-facing surface 112 proximate the write pole 206. Light propagating through the waveguide causes the NFT 214 to achieve surface plasmon resonance.

Shown in FIG. 2 is an optical sensor 216 that may optionally be used to measure optical output of the energy source 106. This sensor 216 may include a bolometer, dual-ended thermal coefficient of resistivity (DETCR) sensor, photodiode, photovoltaic cell, etc. The sensor 216 is shown here near the NFT 214, but may be located elsewhere, e.g., at the top surface of the read/write head 100 near the energy source 106, integrated into the energy source, etc. Also seen in FIG. 2 are heaters 218, 220 which may be integrated into the read/write head 100 and used to separately affect clearances between the transducers 108a, 108b and a disk 222. The heaters 218, 220 may be resistive heaters, inductive heaters, etc., and are generally controllable by varying currents passing through the heaters 218, 220.

Figure 3:
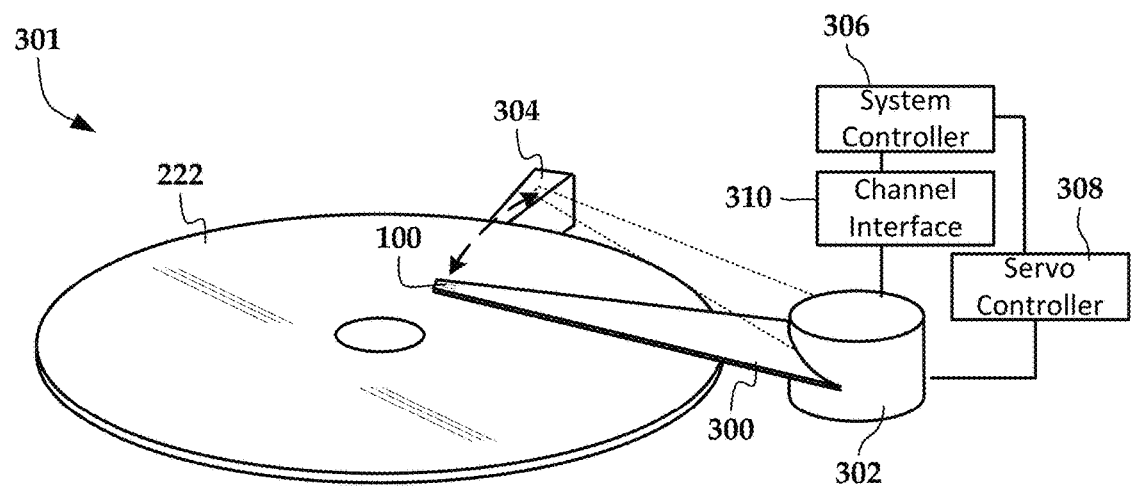
FIG. 3 is a perspective view of drive components according to an example embodiment.

In FIG. 3, a perspective view shows additional components of a disk drive apparatus 301 that houses the head 100 and disk 222. The head 100 is carried over the disk 222 by an arm 300 that is driven by an actuator 302, e.g., a voice coil motor (VCM). A layer of gases driven by the spinning disk 222 causes the head 100 to be suspended over the disk 222. The interaction between the head 100 and the fluid flow is enhanced by air-bearing features on the media-facing surface of the head 100. When the disk 222 is not spinning, or when the drive has other reasons to protect the head 100 and disk 222 (e.g., unexpected power loss), the actuator 302 can move the head 100 to a ramp 304, as indicated by the dashed arrow. Note that a drive may include multiple disks, and may also have multiple heads and arms per disk (e.g., one for each disk surface). In such a case, the ramp structure 304 can include multiple ramp surfaces that park all of the heads by rotating the arms to their outer limit.

Also seen in FIG. 3 is a system controller 306, a servo controller 308, and a channel interface 310. The system controller 306 manages the high-level functions of the drive, such as managing host requests, directing startup and shutdown procedures, and coordinating actions of the servo controller 308 and channel interface 310. The channel interface 310 includes circuitry that facilitates communications between the head 100 and the controller. Such circuitry may in digital-to-analog converters (DACs), analog-to-digital converters (ADCs), filters, digital signal processors (DSP), timing recovery, encoders, decoders, etc. Note that the channel circuitry may include processor executable instructions (e.g., software, firmware) to accomplish some of these functions. The channel interface 310 may be used to send command signals to the head 100, e.g., to control lasers, heaters, write transducers, etc. The channel interface 310 may also receive data from the head 100, e.g., user data from read transducers, sensor data from optical sensors, etc.

The servo controller 308 governs inputs to the actuator 302 so that the head 100 can be accurately positioned over the disk 222. The servo controller 308 will generally include feedback circuits that read position errors via the read sensor in the head 100 an apply corrections to the head position via the actuator 302. The servo controller 308 may also utilize other sensors (e.g., rotational vibration sensors) to compensate for vibrational disturbances.

Methods and apparatuses described herein may contain several techniques to measure mode hops that are faster and cheaper than doing temperature ramps in the factory process. These techniques can also perform measurements over a greater temperature range than what is currently possible in basic, quick electrical testing. For example, an estimate of laser temperature can be measured via the laser voltage and/or a DETCR sensor. Any combination of these measurements can be running as the heads come off the ramp and onto the disk as the laser sees a large temperature change (e.g., greater than 30° C.). Mode hops can then be determined from using one or both of these signals. For example, peaks or dips in an otherwise smooth DETCR curve as the heads are coming off the ramp and onto the disk can indicate the severity, frequency, and temporal width of the width mode hops.

Another way to measure the mode hops of a head is as soon as the heads have come off the ramp and can write is to actually write as much test data as possible to the disk before the laser's temperature has stabilized. The heads can then read this test data at any later time to look for any signs of mode hops in the readback signal (e.g., phase shifts), assuming the test data has not be overwritten. The reason this works is that as the head is writing its temperature is changing dramatically—because it just came off the ramp where there was very minimal cooling—and it potentially crossed many mode hopping boundaries and thus the mode hops are written-in to the test data. By reading back the test data and looking for particular patterns (e.g., phase shifts), mode hops can be better characterized (e.g. we can determine the size and frequency of the mode hops). Also, by simultaneously monitoring various signals mentioned above (e.g. the DETCR signal, Bolometer signal, laser voltage, or laser temperature) one can get confirmatory evidence a mode hop occurred.

Figure 4:
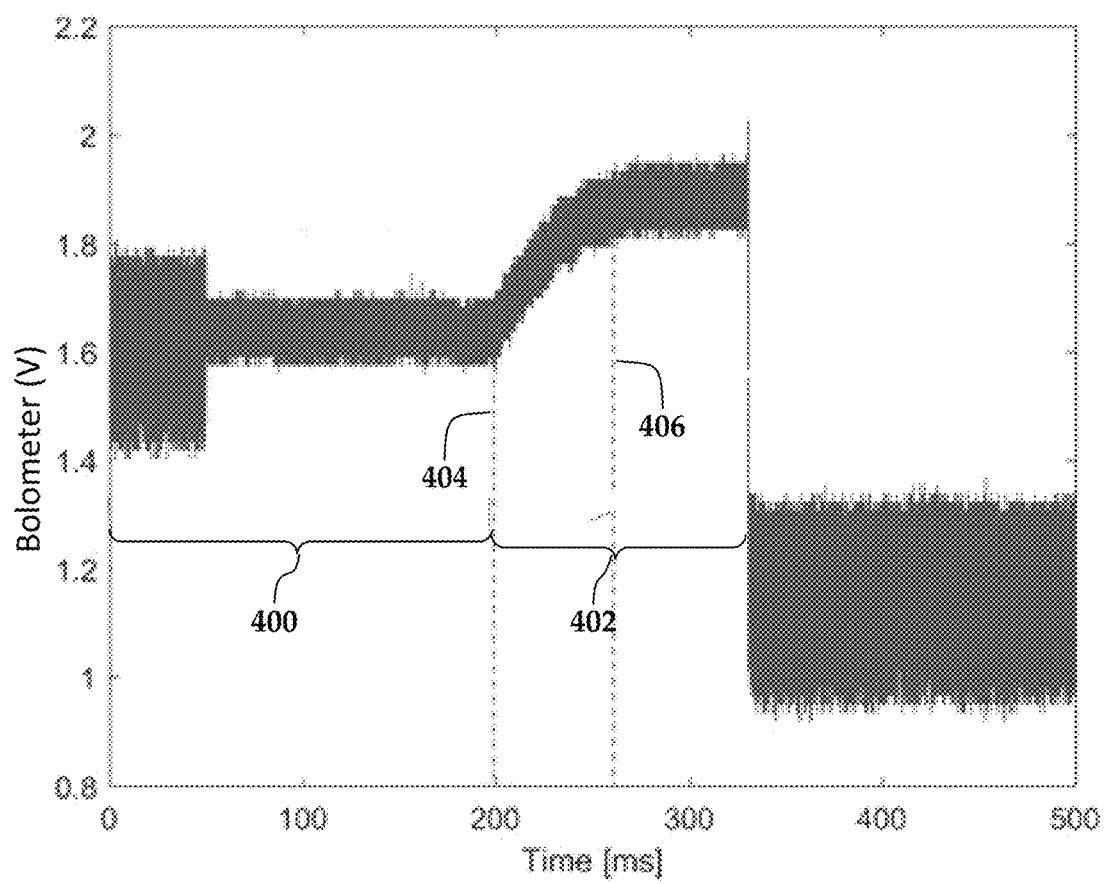
FIG. 4 is a graph of a bolometer signal showing on- and off-ramp heating of a recording head according to an example embodiment.

In FIG. 4, a graph shows measurements of a bolometer within a head that is preheated on a ramp according to an example embodiment. At time range 400, the preheated head is moved off the ramp towards the disk. At region 402, a further increase in temperature is seen, which is likely because the spinning disk is cooling the laser to make it more efficient, resulting in increased light output from the laser, ultimately resulting in a stronger signal sensed by the DETCR, bolometer, or other sensor. Note that the bolometer will react to both heating of surroundings and to optical power from the laser. Depending on its location, it can be highly sensitive to heat caused by laser emissions if placed closer to the waveguide and further from other heat sources (e.g. the disk), such that a peak such as this may be seen even if the laser itself is cooling in this region 402. In this figure, region 402 represents an approximate 120 ms window in which the laser can be monitored for mode hopping. Ultimately this indicates that a bolometer or DETCR signal will show a drastic change when there is a cooling or heating effect—as expected—which is useful for estimating temperature changes seen by the laser.

The head may include more than one controllable heat source that can be used to heat the head while upon the ramp. These heat sources include the laser, one or more types of heaters, and the write coil(s) (see, e.g., FIG. 2). The heat sources can be activated in any combination as desired. Generally, the change in temperature from the ramp to the disk can be used to characterize mode hops. For example, a reading can be taken from an optical sensor at a first time 404 after the recording head is moved off of the ramp to a second time 406 when the recording head is cooled by the moving disk. One or more sudden changes in optical power between the first and second time indicates one or more temperatures indicative of mode hopping. Note that the temperatures 404, 406 can be moved left or right from what is shown, e.g., to ensure a constant baseline temperature is seen in region 402 and/or to measure the change (or lack thereof) in the right side of time period 402.

Figure 5:
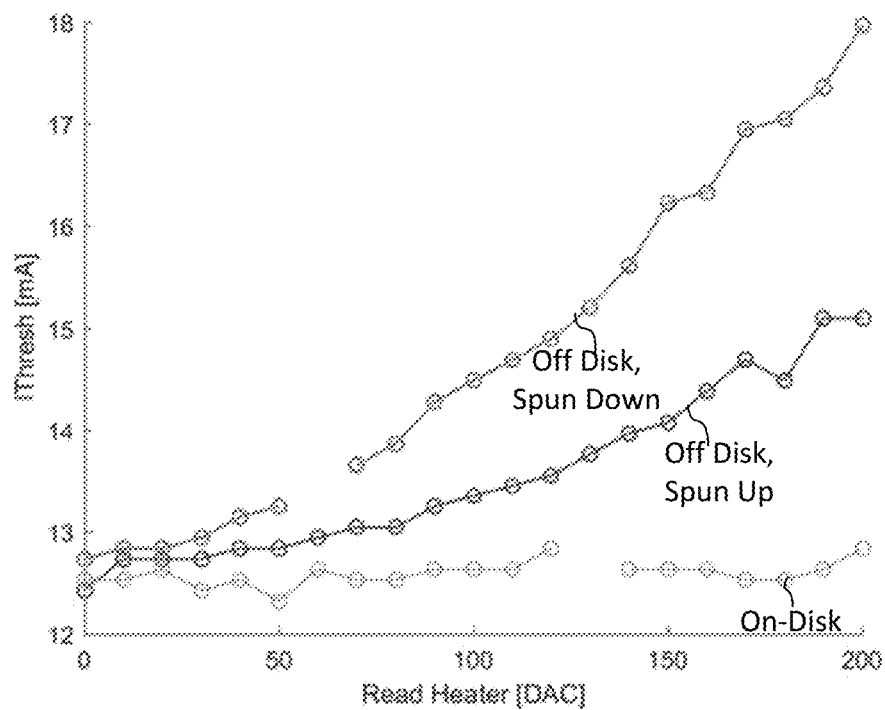
FIGS. 5 and 6 are graphs showing laser current and voltage under various heating conditions according to example embodiments.

In FIG. 5, a graph shows the effect of putting the heads on the ramp on the laser threshold current as function of heat applied to a read heater according to an example embodiment. The threshold current (IThresh) is an amount of current needed for the laser to begin emitting light. In general, when a laser is hotter, it requires more current to get the laser to output light, such that IThresh increases with temperature. Therefore if the IThresh of a laser is increasing, one reason could be because the temperature of the laser is getting hotter. This graph shows that when the head is on the disk, IThresh does not change with applied heat. This is because the disk is cooling the laser so well that the heat from the heater negligibly affects the laser. When the head is moved off the disk, the applied heat effect on IThresh is pronounced. Furthermore, stopping the disk causes IThresh to increase even more as a function of applied heat, most likely because there is zero to minimal flow of gas in the HDD now that the disk has stopped spinning.

Figure 6:
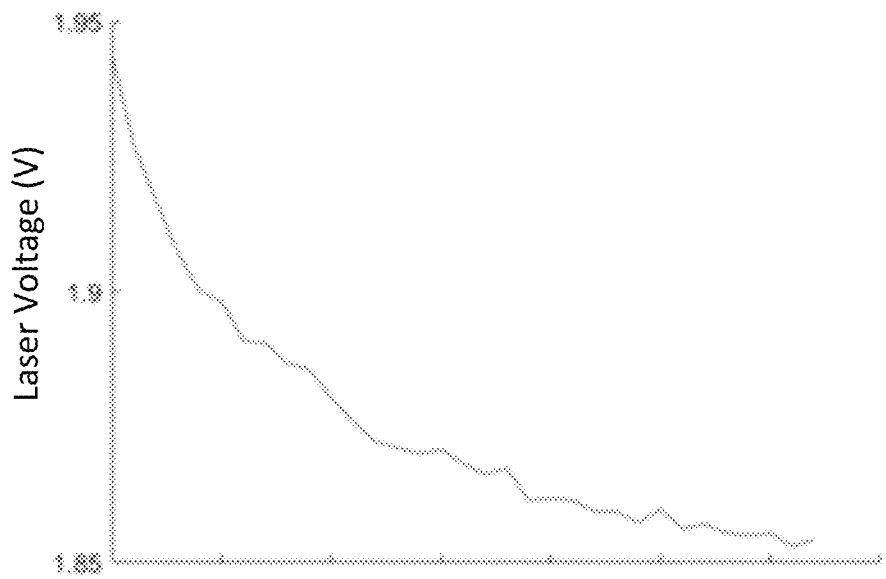

In FIG. 6, a graph shows the effect of heat on laser temperature as measured by the laser diodes voltage according to an example embodiment. In this case, the laser is on the ramp for seven revolutions of the disk with a heater being applied for all seven revolutions. One can see the laser voltage is dropping as the laser is being heated up, validating a hotter laser will see a laser voltage drop. Therefore, in the embodiments described above if one sees a laser voltage change (when the current/voltage being supplied to a laser is constant), one can infer the laser's temperature has changed. This figure shows that a significant change in the laser temperature can be induced by heating the laser on the ramp.

The measurement techniques describe above may be used in the factory as well as being used in fielded devices. The measurement could first be made in a factory process to get a baseline measurement of the mode hopping characteristics of the head at the start of its life, e.g., measure the severity, frequency, and locations of mode hops. Then periodically in the field, the drive could be taken offline, the heads moved on to the ramp, and the same measurement could be performed to see how the mode hopping characteristics of the heads change over the life of the head. These change in characteristics can be used to validate and/or improve the head designs, e.g., anticipate the magnitude and direction of mode hop shifts as a function of write-power-on hours over the life of the drive.

One consideration for an in-field measurement is the time it takes to perform the test in relation to the time allowed to suspend servicing of host commands. For example, if the time do both the test and service a host command takes 50 ms and the test takes 40 ms, then this could be acceptably within performance requirements. If the test takes 100 ms, then it may not be feasible to perform during regular operation of the drive. There may still be opportunities to perform such a test at other times, e.g., upon restart of the drive after intentional or unintentional power off, when the drive is put in an "idle mode" or "low power" mode, etc. These may occur less frequently, however, especially in a server environment.

Figure 7:
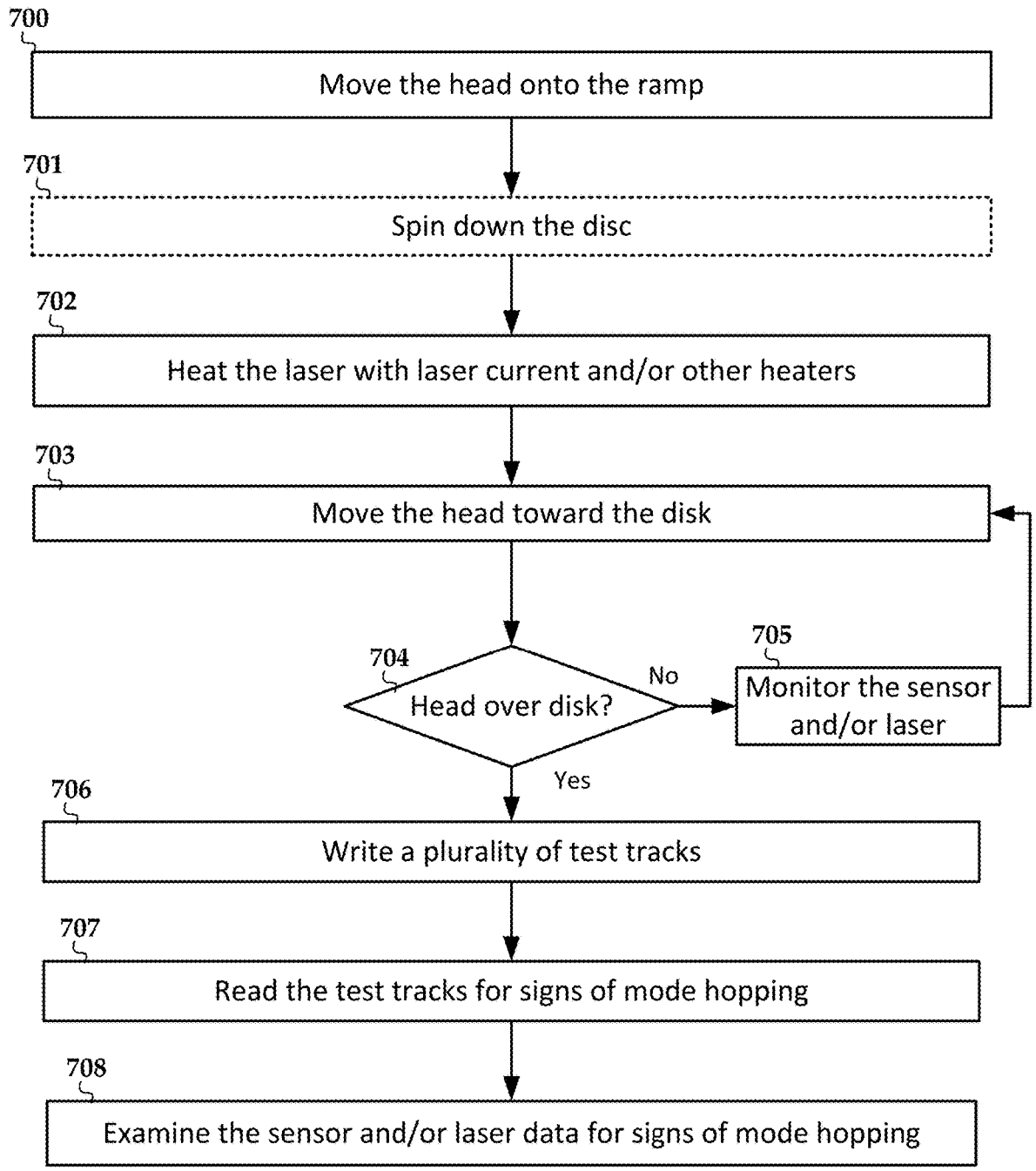
FIGS. 7 and 8 are flowcharts of methods according to example embodiments.

In FIG. 7, a flowchart shows a procedure for characterizing laser mode hopping according to an example embodiment. The procedure starts by moving 700 the head onto the ramp. Optionally, the disk can be spun down 701 to get the laser even hotter, assuming there is sufficient time to wait for the spin down and spin up. Once on the ramp, the laser is heated 702 via the laser current and/or heaters described above. After a predetermined amount of time (or based on a sensor measurement), the head is moved 703 towards the disk. While the head is still not on the disk, as indicated by block 704, the laser voltage, laser current, DETCR signal, etc., and/or some other sensor signal can be monitored. At some time the additional heat being applied to laser will be backed off or minimized such that the slider is not super-hot when it moves off the ramp, where, if it were super-hot, would have the potential to crash into the disk.

Once block 704 exits at "yes," the head has arrived on the disk, after which it may be used to write 706 a plurality of test tracks (e.g., adjacent tracks near the outer diameter of the disk). Then the head can be used to read 707 the test tracks to look for signs of mode hopping. In addition to reading 707 the data (or instead), the sensor/laser data gathered at block 705 (which may also be gathered during the loading of the heads to the disc as well as the writing in block 706) can be examined 708 to determine signs of mode hopping.

The procedure described above can be done in the factory and/or the field. Generally, any mode hopping temperatures (or corresponding metrics) so discovered can be saved as operational parameters that are applied to the drive. For example, if a laser temperature (or some other measurement that correlates to laser temperature) approaches a known mode-hopping region during writing, the drive may change inputs (e.g., laser current, write coil current, heater, head used to write data, etc.) in an attempt to avoid reaching that temperature. In other embodiments, write operations can be suspended until the head is safely outside the mode-hopping temperature region.

Figure 8:
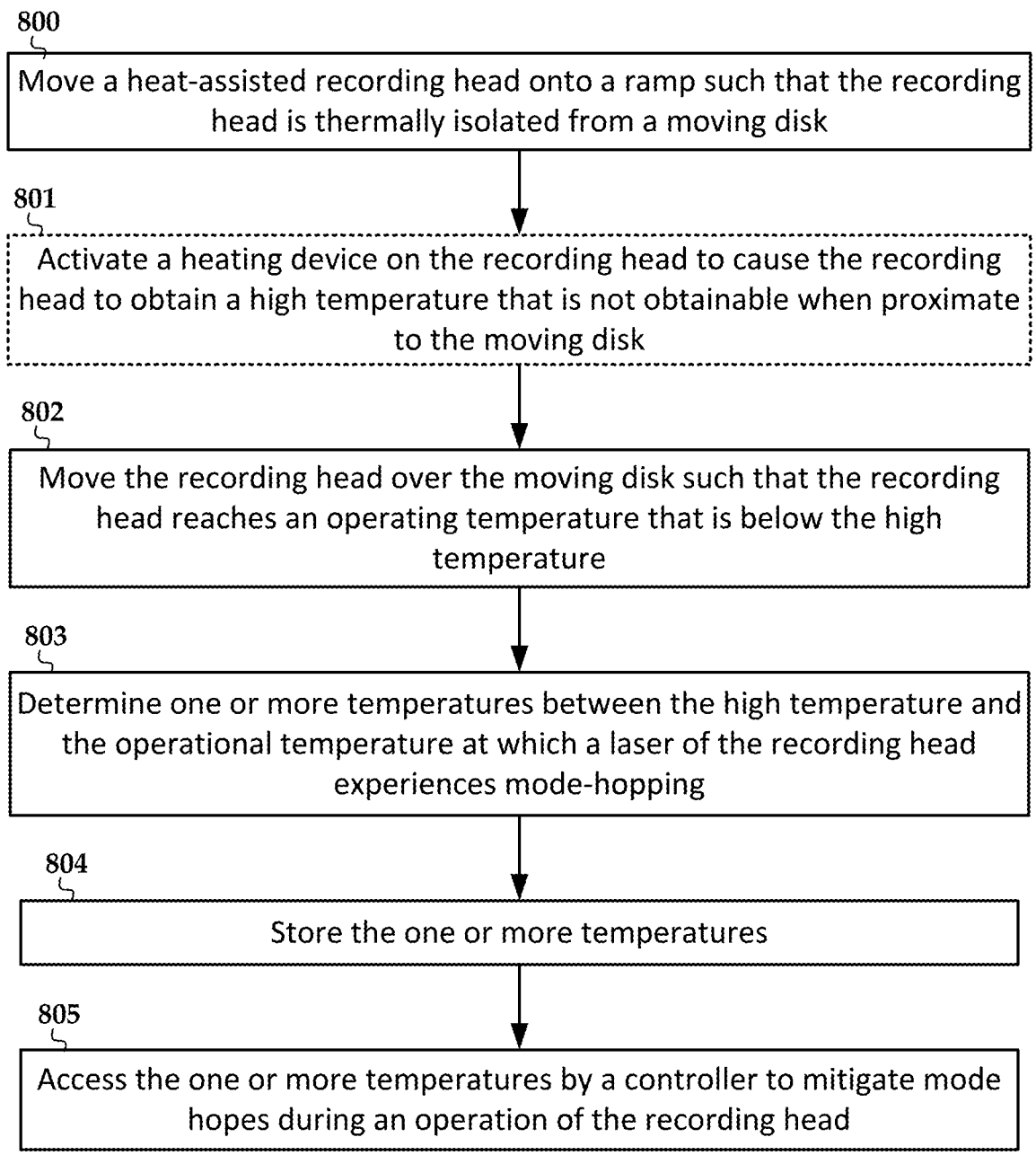

In FIG. 8, a flowchart shows a method according to an example embodiment. The method involves moving 800 a heat-assisted recording head onto a ramp such that the recording head is thermally isolated from a moving disk. A heating device on the recording head is activated 801 to cause the recording head/laser to obtain a high temperature that is not obtainable when proximate to the moving disk. After the heating 801, the recording head is moved 802 over the moving disk such that the recording head reaches an operating temperature that is below the high temperature (e.g., a nominal operational temperature).

Figure 9:
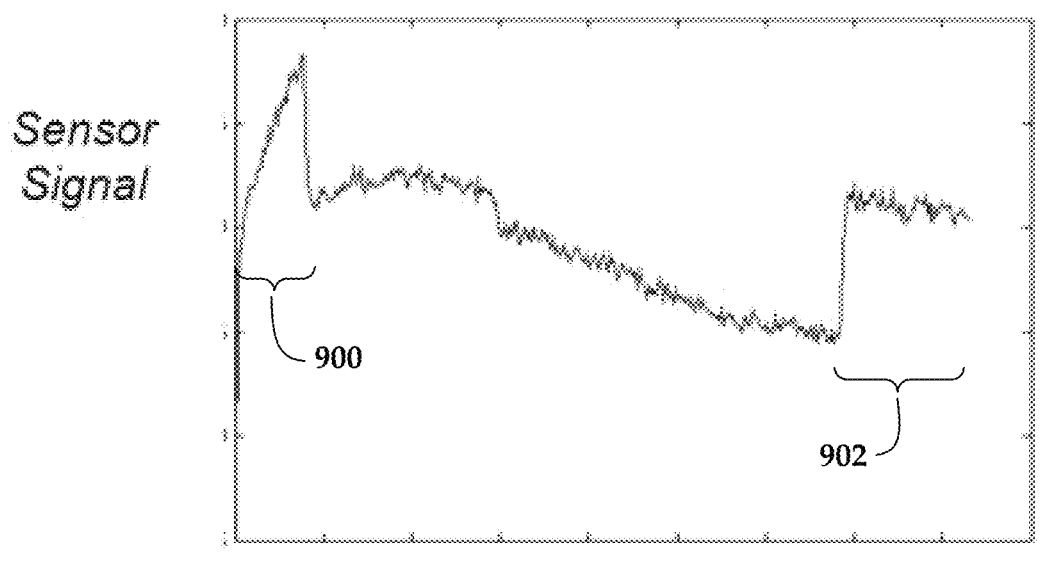
FIG. 9 is a graph of sensor readings showing how mode hops during writing can be determined in an example embodiment.

After or during operation 802, one or more temperatures between the high temperature and the operational temperature are determined at which a laser of the recording head experiences mode-hopping. For example, determining the one or more temperatures may involve reading from an optical sensor (e.g., bolometer, DETCR) from a first time that the recording head is moved off of the ramp to a second time when the recording head is over the moving disk. One or more sudden changes in optical power between the first and second time indicate the one or more temperatures where the laser was perhaps mode hopping. Because mode hops are very abrupt changes in light being sent to the media, one way to look for mode hops is to look for sudden changes in one or more of sensors such as DETCR or bolometer. In FIG. 9, a graph shows a typical sensor (e.g., DETCR or bolometer) being monitored during a full track write. At regions 900 and 902, sharp changes occurring near the beginning and ending of the write are seen. These indicate a very sharp change in the signal being sent to the sensor, for example by a sharp change in power delivered by the laser.

In reference again to FIG. 8, the one or more temperatures are stored 804 and are accessed by a controller to mitigate 805 mode hops during an operation of the recording head. Note that the mode hopping temperatures measured at 803 are not the only temperatures that can be used to mitigate 805 the mode hops. For example, some drives will mode hop at regular temperature intervals. So these intervals can be used to extrapolate upwards or downwards to predict mode hops that occur outside of the tested temperature range. For example, if mode hops are detected at 55 C, 60 C, and 65 C, then it may be inferred that mode hops will occur at 50 C and 70 C.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A method, comprising:
    moving a heat-assisted recording head onto a ramp such that the recording head is thermally isolated from a moving disk;
    activating a heating device on the recording head to cause the recording head to obtain a high temperature that is not obtainable when proximate to the moving disk;
    moving the recording head over the moving disk such that the recording head reaches an operating temperature that is below the high temperature;
    determining one or more temperatures between the high temperature and the operational temperature at which a laser of the recording head experiences mode-hopping, and
    using the one or more temperatures by a controller to mitigate mode hops during an operation of the recording head.

2. The method of claim 1, wherein the disk is stopped while activating the heating device.

3. The method of claim 1, wherein the heating device comprises the laser.

4. The method of claim 1, wherein the heating device comprises a resistive or inductive heater.

5. The method of claim 1, wherein the heating device comprises a write pole.

6. The method of claim 1, wherein determining the one or more temperatures comprises:
    recording data to the moving disk while the recording head transitions between the high temperature and the operating temperature, portions of the data being associated with different temperatures; and
    based on reading back the data, determining data characteristics in selected portions of the data that are indicative of mode hops, wherein the one or more temperatures are associated with the selected portions.

7. The method of claim 1, wherein determining the one or more temperatures comprises reading from an optical sensor from a first time after the recording head is moved off of the ramp to a second time when the recording head is cooled by the moving disk, one or more sudden changes in optical power between the first and second time indicating the one or more temperatures indicative of mode hopping.

8. The method of claim 7, wherein the optical sensor comprises one of a dual-ended, temperature coefficient of resistivity sensor, a bolometer, and a voltage of laser.

9. The method of claim 1, wherein determining the one or more temperatures comprises extrapolating beyond the high temperature and the operating temperature to determine additional temperatures where mode hopping is predicted.

10. The method of claim 1, wherein the method is performed in a factory process.

11. The method of claim 1, wherein the method is performed in a fielded hard disk drive.

12. The method of claim 11, wherein the one or more temperatures indicative of mode hopping are tracked as a function of time and compared against factory-measured mode-hop temperatures.

13. An apparatus, comprising:
    a channel interface configured to communicate with a heating device on a heat-assisted recording head;
    a servo controller coupled to an actuator that moves the recording head; and
    a system controller coupled to the channel interface and the servo controller, the system controller configured to:
        move the heat-assisted recording head onto a ramp such that the recording head is thermally isolated from a moving disk;
        activate the heating device to cause the recording head to obtain a high temperature that is not obtainable when proximate to the moving disk;
        move the recording head over the moving disk such that the recording head reaches an operating temperature that is below the high temperature;
        determine one or more temperatures between the high temperature and the operational temperature at which a laser of the recording head experiences mode-hopping; and
        use the one or more temperatures to mitigate mode hops during an operation of the recording head.

14. The apparatus of claim 13, wherein the disk is stopped while activating the heating device.

15. The apparatus of claim 13, wherein determining the one or more temperatures comprises:
    recording data to the moving disk while the recording head transitions between the high temperature and the operating temperature, portions of the data being associated with different temperatures; and
    based on reading back the data, determining data characteristics in selected portions of the data that are indicative of mode hops, wherein the one or more temperatures are associated with the selected portions.

16. The apparatus of claim 13, wherein determining the one or more temperatures comprises reading from an optical sensor from a first time that the recording head is moved off of the ramp to a second time after the recording head is cooled by the moving disk, one or more sudden changes in optical power between the first and second time indicating the one or more temperatures indicative of mode hopping.

17. A system, comprising:
a heat-assisted recording head comprising at least a laser, a heating device, and a sensor from which temperature data can be derived;
an actuator that moves the recording head across a disk; and
a system controller coupled to the recording head and the actuator, the system controller configured to:
move the heat-assisted recording head onto a ramp such that the recording head is thermally isolated from the disk;
activate the heating device to cause the recording head to obtain a high temperature that is not obtainable when proximate to the moving disk;
move the recording head over the disk when the disk is moving such that the recording head reaches an operating temperature that is below the high temperature;
determine, via the sensor, one or more temperatures between the high temperature and the operational temperature at which the laser of the recording head experiences mode-hopping; and
use the one or more temperatures to mitigate mode hops during an operation of the recording head.

18. The system of claim 17, wherein the disk is stopped while activating the heating device.

19. The system of claim 17, wherein the heating device comprises at least one of the laser, a resistive heater, an inductive heater, and a write pole.

20. The system of claim 17, wherein determining the one or more temperatures comprises:
recording data to the moving disk while the recording head transitions between the high temperature and the operating temperature, portions of the data being associated with different temperatures; and
based on reading back the data, determining data characteristics in selected portions of the data that are indicative of mode hops, wherein the one or more temperatures are associated with the selected portions.

21. The system of claim 17, wherein determining the one or more temperatures comprises reading from an optical sensor from a first time after the recording head is moved off of the ramp to a second time when the recording head is cooled by the moving disk, one or more sudden changes in optical power between the first and second time indicating the one or more temperatures.

* * * * *